United States Patent [19]
Matsunaga et al.

[11] Patent Number: 5,986,008
[45] Date of Patent: Nov. 16, 1999

[54] PROPYLENE POLYMER COMPOSITION AND THERMOFORMED OBJECT

[75] Inventors: Shinya Matsunaga; Akira Todo; Satoru Moriya; Akio Ishimoto; Tetsuhiro Matsumoto, all of Yamaguchi, Japan

[73] Assignee: Mitsui Chemicals, Inc., Tokyo, Japan

[21] Appl. No.: 09/142,035

[22] PCT Filed: Jan. 9, 1998

[86] PCT No.: PCT/JP98/00054

§ 371 Date: Sep. 1, 1998

§ 102(e) Date: Sep. 1, 1998

[87] PCT Pub. No.: WO98/30629

PCT Pub. Date: Jul. 16, 1998

[30] Foreign Application Priority Data

Jan. 9, 1997 [JP] Japan ........................................ 9-2347

[51] Int. Cl.⁶ .................................................... C08L 23/04
[52] U.S. Cl. ............................................................. 525/240
[58] Field of Search ........................ 525/240; 526/348.2, 526/348.3, 348.4, 348.5, 348.6

[56] References Cited

U.S. PATENT DOCUMENTS 4,487,871 12/1984 Ishibashi ................................. 524/100
5,358,792 10/1994 Mehta ..................................... 428/516

FOREIGN PATENT DOCUMENTS 0316692   5/1989   European Pat. Off. .
0646624   4/1995   European Pat. Off. .
7-173317  7/1995   Japan .
9-302163  11/1997  Japan .
9416009   7/1994   WIPO .
9907788   2/1999   WIPO .

*Primary Examiner*—Paul R. Michl
*Attorney, Agent, or Firm*—Birch, Stewart, Kolasch & Birch, LLP

[57] ABSTRACT

The present invention is to provide a propylene polymer composition capable of producing heat molded products having excellent balance between rigidity and impact resistance and to provide heat molded products produced from the composition, such as films and pipes. The propylene polymer composition comprises 10 to 90% by weight of a propylene polymer (A) and 90 to 10% by weight of a propylene polymer (B). The propylene polymer (A) has $MFR_A$ (measured at 230° C. under a load of 2.16 kg) of 0.001 to 8 g/10 min, Tm (measured by a differential scanning calorimeter) of 95 to 145° C. and a density ($d_A$) of 885 to 905 kg/M³, and in this polymer, the content of constituent units derived from an α-olefin of 4 to 20 carbon atoms is in the range of 1.5 to 11% by mol. The propylene polymer (B) has $MFR_B$ (measured at 230° C. under a load of 2.16 kg) of 0.1 to 600 g/10 min, Tm (measured by a differential scanning calorimeter) of 145 to 170° C., a density ($d_B$) of 905 to 916 kg/m³, and in this polymer, the content of constituent units derived from an (α-olefin of 4 to 20 carbon atoms is in the range of 0 to 2% by mol. The $MFR_A$ and the $MFR_B$ satisfy the relation $0.1 \leq \log(MFR_B/MFR_A) \leq 6.1$, and the $d_A$ and the $d_B$ satisfy the relation $2 \leq d_B - d_A \leq 31$.

7 Claims, No Drawings

PROPYLENE POLYMER COMPOSITION AND THERMOFORMED OBJECT

This application is the national phase under 35 U.S.C. §371 of prior PCT International Application No. PCT/JP98/00054 which has an International filing date of Jan. 09, 1998 which designated the United States of America, the entire contents of which are hereby incorporated by reference.

TECHNICAL FIELD

The present invention relates to propylene polymer compositions and heat molded products. More particularly, the invention relates to propylene polymer compositions from which heat molded products having good balance between rigidity and impact resistance are obtainable and relates to heat molded products obtainable from the compositions.

BACKGROUND ART

Because of its excellent rigidity, heat resistance and impact resistance, polypropylene is molded by various molding processes and used in many fields. The properties required for the polypropylene differ from each other according to the molding process or the use of the polypropylene. For example, when the polypropylene is used as a material of sewage pipe, potable water pipe or gas pipe, excellent pipe fatigue properties, mechanical strength and moldability are required for the polypropylene. Recently, there has been a growing demand for improvement in rigidity for the purpose of increasing economical efficiency by for example thinning the pipe wall, and there has been a growing demand for improvement in moldability for the purpose of decreasing electric power consumption. When the polypropylene is used as a material of films, impact resistance is required and also transparency is occasionally required for the polypropylene.

The present inventors have studied propylene polymer compositions capable of producing heat molded products, particularly pipes and films, having excellent mechanical strength, and as a result they have found that heat molded products having excellent mechanical strength can be obtained from a composition comprising a propylene polymer of lower density which has a specific melt flow rate and a specific temperature at the maximum peak position of an endothermic curve measured by a differential scanning calorimeter and a propylene polymer of higher density which has a specific melt flow rate and a specific temperature at the maximum peak position of an endothermic curve measured by a differential scanning calorimeter and that pipes and films obtained from the composition particularly have excellent properties. Based on the finding, the present invention has been accomplished.

DISCLOSURE OF THE INVENTION

The propylene polymer composition according to the present invention is a composition comprising:

(A) a propylene polymer in an amount of 10 to 90% by weight, said polymer having the following properties:
  (1) the melt flow rate, as measured at 230° C. under a load of 2.16 kg, is in the range of 0.001 to 8 g/10 min,
  (2) the temperature at the maximum peak position of an endothermic curve of said polymer measured by a differential scanning calorimeter (DSC) is in the range of 95 to 145° C.,
  (3) the density is in the range of 885 to 905 kg/m³, and
  (4) the content of constituent units derived from an α-olefin of 4 to 20 carbon atoms is in the range of 1.5 to 11% by mol; and (B) a propylene polymer in an amount of 90 to 10% by weight, said polymer having the following properties:
  (1) the melt flow rate, as measured at 230° C. under a load of 2.16 kg, is in the range of 0.1 to 600 g/10 min,
  (2) the temperature at the maximum peak position of an endothermic curve of said polymer measured by a differential scanning calorimeter is in the range of 145 to 170° C.,
  (3) the density is in the range of 905 to 916 kg/m³, and
  (4) the content of constituent units derived from an α-olefin of 4 to 20 carbon atoms is in the range of 0 to 2% by mol;

wherein (1) the melt flow rate ($MFR_A$ (g/10 min.)) of the propylene polymer (A) and the melt flow rate ($MFR_B$ (g/10 min)) of the propylene polymer (B) satisfy the following relation $$0.1 \leq \log(MFR_B/MFR_A) \leq 6.1,$$

and (2) the density ($d_A$ (kg/m³)) of the propylene polymer (A) and the density ($d_B$ (kg/m³)) of the propylene polymer (B) satisfy the following relation $$2 \leq d_B - d_A \leq 31.$$

A heat molded product obtained by heat molding the propylene polymer composition has excellent rigidity.

When a pipe is produced from the propylene polymer composition, the composition preferably has the following properties:
  (1) the melt flow rate, as measured at 230° C. under a load of 2.16 kg, is in the range of 0.005 to 2.0 g/10 min,
  (2) the temperature at the maximum peak position of an endothermic curve of said composition measured by a differential scanning calorimeter is in the range of 128 to 157° C.,
  (3) the density is in the range of 899 to 911 kg/m³, and
  (4) the flexural modulus of a pressed sheet specimen prepared from said composition at 200° C. is in the range of 800 to 1,900 MPa.

If the propylene polymer composition is heat molded into a pipe, the pipe has excellent rigidity and creep resistance.

When a film is produced from the propylene polymer composition, the composition preferably has the following properties:
  (1) the melt flow rate, as measured at 230° C. under a load of 2.16 kg, is in the range of 4 to 25 g/10 min,
  (2) the temperature at the maximum peak position of an endothermic curve of said composition measured by a differential scanning calorimeter is in the range of 128 to 157° C.,
  (3) the density is in the range of 899 to 911 kg/m³, and
  (4) the flexural modulus of a pressed sheet specimen prepared from said composition at 200° C. is in the range of 800 to 1,900 MPa.

If the propylene polymer composition is heat molded into a film, the film has excellent rigidity, transparency and impact resistance.

In the present invention, the propylene polymer (A) and the propylene polymer (B) are preferably those prepared by the use of a metallocene catalyst.

BEST MODE FOR CARRYING OUT THE INVENTION

The propylene polymer composition according to the invention and the heat molded products obtained from the composition are described in detail hereinafter."

The propylene polymer composition of the invention is a composition comprising the following propylene polymer (A) and the following propylene polymer (B).

The propylene polymer (A) for forming the propylene polymer composition satisfies the following requisites (1) to (4).

(1) The melt flow rate (MFR), as measured at 230° C. under a load of 2.16 kg, is in the range of usually 0.001 to 8 g/10 min, preferably 0.005 to 6 g/10 min.

(2) The temperature (Tm), as measured by a differential scanning calorimeter (DSC), is in the range of usually 95 to 145° C., preferably 100 to 140° C.

(3) The density is in the range of usually 885 to 905 kg/m$^3$, preferably 887 to 903 kg/m$^3$.

(4) The content of constituent units derived from an α-olefin of 4 to 20 carbon atoms is in the range of usually 1.5 to 11% by mol, preferably 2 to 10% by mol. Examples of the α-olefins of 4 to 20 carbon atoms include 1-butene, 1-pentene, 1-hexene, 4-methyl-1-pentene, 1-octene, 1-decene, 1-dodecene, 1-tetradecene, 1-hexadecene, 1-octadecene and 1-eicosene. As the α-olefin, an a-olefin of 4 to 10 carbon atoms is preferable.

The propylene polymer (B) for forming the propylene polymer composition satisfies the following requisites (1) to (4).

(1) The melt flow rate (MFR), as measured at 230° C. under a load of 2.16 kg, is in the range of usually 0.1 to 600 g/10 min, preferably 0.3 to 500 g/10 min.

(2) The temperature (Tm), as measured by a differential scanning calorimeter (DSC), is in the range of usually 145 to 170° C., preferably 147 to 168° C.

(3) The density is in the range of usually 905 to 916 kg/m$^3$, preferably 906 to 915 kg/m$^3$.

(4) The content of constituent units derived from an α-olefin of 4 to 20 carbon atoms is in the range of usually 0 to 2% by mol, preferably 0 to 1% by mol. As the α-olefin, an α-olefin of 4 to 10 carbon atoms is preferable.

The propylene polymer (A) and the propylene polymer (B) can be prepared by various processes. For example, they can be prepared using either a titanium catalyst formed from a solid titanium catalyst component and an organometallic compound catalyst component, a high-activity titanium catalyst formed from these components and an electron donor, or a metallocene catalyst formed from a metallocene compound and aluminoxane or the like. In the present invention, the propylene polymer (A) and the propylene polymer (B) are preferably those prepared by the use of a metallocene compound, particularly preferably those prepared by the use of the following a metallocene catalyst.

The metallocene catalyst preferably used for preparing the propylene polymer (A) and the propylene polymer (B) for use in the invention comprises a metallocene compound of a transition metal selected from Group 4 of the periodic table, and an organoaluminum oxy-compound and/or an ionizing ionic compound. The metallocene compound of a transition metal selected from Group 4 of the periodic table, that is used for forming the metallocene catalyst, is specifically represented by the following formula (I).

$$M^1L^1_x \qquad (I)$$

In the above formula, $M^1$ is a transition metal selected from Group 4 of the periodic table, specifically zirconium, titanium or hafnium. x is a valence of the transition metal $M^1$ and denotes the number of ligands $L^1$ coordinated to the transition metal.

$L^1$ is a ligand coordinated to the transition metal, and at least one ligand $L^1$ is a ligand having cyclopentadienyl skeleton, such as a cyclopentadienyl group, an indenyl group, a 4,5,6,7-tetrahydroindenyl group or a fluorenyl group. The ligand having cyclopentadienyl skeleton may have substituents such as alkyl groups, cycloalkyl groups, aryl groups (e.g., phenyl and naphthyl), trialkylsilyl groups and halogen atoms.

When the metallocene compound has two or more groups having cyclopentadienyl skeleton as the ligands $L^1$, two of them are desirably bonded through a bonding group such as an alkylene group, a substituted alkylene group, a silylene group or a substituted silylene group.

$L^1$ other than the ligand having cyclopentadienyl skeleton is, for example, a hydrocarbon group of 1 to 12 carbon atoms, an alkoxy group, an aryloxy group, a sulfonic acid-containing group (—SO$_3$R$^a$ wherein R$^a$ is an alkyl group, an alkyl group substituted with a halogen atom, an aryl group, an aryl group substituted with a halogen atom, or an aryl group substituted with an alkyl group), a halogen atom or a hydrogen atom.

Examples of the metallocene compounds having zirconium as $M^1$ and containing two ligands having cyclopentadienyl skeleton are given below.

Ethylene-bis(indenyl)dimethylzirconium,
Ethylene-bis(indenyl)zirconium dichloride,
Isopropylidene(cyclopentadienyl-fluorenyl)zirconium dichloride,
Diphenylsilylene-bis(indenyl)zirconium dichloride,
Methylphenylsilylene-bis(indenyl)zirconium dichloride,
rac-Ethylene-bis(2-methyl-1-indenyl)zirconium dichloride,
rac-Dimethylsilylene-bis(2-methyl-1-indenyl)zirconium dichloride,
rac-Dimethylsilylene-bis(4,7-dimethyl-1-indenyl) zirconium dichloride,
rac-Dimethylsilylene-bis(2,4,7-trimethyl-1-indenyl) zirconium dichloride,
rac-Dimethylsilylene-bis(2,4,6-trimethyl-1-indenyl) zirconium dichloride,
rac-Dimethylsilylene-bis(4-phenyl-1-indenyl)zirconium dichloride,
rac-Dimethylsilylene-bis(2-methyl-4-phenyl-1-indenyl) zirconium dichloride,
rac-Dimethylsilylene-bis(2-methyl-4-((α-naphthyl)-1-indenyl)zirconium dichloride,
rac-Dimethylsilylene-bis(2-methyl-4-(β-naphthyl)-1-indenyl)zirconium dichloride, and
rac-Dimethylsilylene-bis(2-methyl-4-(1-anthryl)-1-indenyl)zirconium dichloride.

There can be also exemplified metallocene compounds wherein zirconium is replaced with titanium or hafnium in the above-mentioned compounds.

In the present invention, also employable as the metallocene compound is a transition metal compound represented by the following formula (II):

$$L^2M^2X_2 \qquad (II)$$

wherein $M^2$ is a metal of Group 4 or lanthanum series of the periodic table, $L^2$ is a derivative of a delocalized π-bond group and imparts a restraint geometric shape to the active site of the metal $M^2$, and each X is the same or different and is a hydrogen atom, a halogen atom, or a hydrocarbon group, a silyl group or a germyl group having 20 or less carbon atoms, silicon atoms or germanium atoms.

Of the compounds represented by the formula (II), a transition metal compound represented by the following formula (III) is preferable.

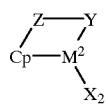

In the above formula, $M^2$ is titanium, zirconium or hafnium, and X is the same as above.

Cp is a substituted cyclopentadienyl group n-bonded to $M^2$ and having a substituent Z.

Z is oxygen, sulfur, boron or an element of Group 14 of the periodic table (e.g., silicon, germanium or tin).

Y s a ligand containing nitrogen, phosphorus, oxygen or sulfur.

Z and Y may together form a condensed ring.

Examples of the compounds represented by the formula (III) include (dimethyl (t-butylamido)(tetramethyl-$\eta^5$-cyclopentadienyl)silane)titanium dichloride and ((t-butylamido)(tetramethyl-$\eta^5$-cyclopentadienyl)-1,2-ethanediyl)titanium dichloride.

The metallocene compounds mentioned above can be used singly or in combination of two or more kinds.

The metallocene compounds can be used by supporting them on particulate carriers.

Examples of the particulate carriers employable in the invention include inorganic carriers, such as $SiO_2$, $Al_2O_3$, $B_2O_3$, MgO, $ZrO_2$, CaO, $TiO_2$, ZnO, $SnO_2$, BaO and ThO; and organic carriers, such as polyethylene, polypropylene, poly-1-butene, poly-4-methyl-1-pentene and a styrene/divinylbenzene copolymer. These particulate carriers can be used singly or in combination of two or more kinds.

Next, the organoaluminum oxy-compound and the ionizing ionic compound used for forming the metallocene catalyst are described.

The organoaluminum oxy-compound may be conventional aluminoxane or such a benzene-insoluble organoaluminum oxy-compound as exemplified in Japanese Patent Laid-Open Publication No. 78687/1990.

The organoaluminum oxy-compound may contain a small amount of an organic compound component of a metal other than aluminum.

Examples of the ionizing ionic compounds include Lewis acids, ionic compounds, borane compounds and carborane compounds.

The Lewis acids are, for example, a compound represented by the formula $BR_3$ (R is a phenyl group which may have a substituent such as fluorine, methyl or trifluoromethyl, or a fluorine atom). Examples of such compounds include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

Examples of the ionic compounds include trialkyl-substituted ammonium salts, N,N,-dialkylanilinium salts, dialkylammonium salts and triarylphosphonium salts. Particular examples of the trialkyl-substituted ammonium salts include triethylammoniumtetra(phenyl)boron, tripropylammoniumtetra(phenyl)boron and tri (n-butyl) ammoniumtetra(phenyl)boron. Particular examples of the dialkylammonium salts include di(1-propyl)ammoniumtetra (pentafluorophenyl)boron and dicyclohexylammoniumtetra (phenyl)boron. Further, triphenylcarbeniumtetrakis (pentafluorophenyl)borate, N,N-dimethylaniliniumtetrakis (pentafluorophenyl)borate and ferroceniumtetra (pentafluorophenyl)borate are also available as the ionic compounds.

Examples of the borane compounds include decaborane (14), bis[tri(n-butyl)ammonium]nonaborate, bis[tri(n-butyl) ammonium]decaborate, and salts of metallic borane anions such as bis[tri (n-butyl)anmonium]bis (dodecahydridododecaborate)-nickelate(III).

Examples of the carborane compounds include 4-carbanonaborane(14), 1,3-dicarbanonaborane(13), and salts of metallic carborane anions such as bis[tri (n-butyl) ammonium]bis(undecahydrido-7-carbaundecaborate) nickelate(IV).

The ionizing ionic compounds mentioned above can be used singly or in combination of two or more kinds.

The organoaluminum oxy-compounds or the ionizing ionic compounds can be used by supporting them on the aforesaid particulate carriers.

In the preparation of the catalyst, the following organoaluminum compound may be used together with the organoaluminum oxy-compound or the ionizing ionic compound.

As the organoaluminum compound, a compound having at least one Al-carbon bond in the molecule is employable. Such a compound is, for example, an organoaluminum compound represented by the following formula:

$$(R^1)_m Al(O(R^2))_n H_p X_q$$

wherein $R^1$ and $R^2$ may be the same or different and are each a hydrocarbon group of usually 1 to 15 carbon atoms, preferably 1 to 4 carbon atoms; X is a halogen atom; and m, n, p and q are numbers satisfying the conditions of $0<m\leq3$, $0\leq n<3$, $0\leq p<3$, $0\leq q<3$ and m+n+p+q=3.

The propylene polymer (A) can be prepared by copolymerizing propylene and a small amount of an $\alpha$-olefin of 4 to 20 carbon atoms in the presence of the above-described metallocene catalyst, in accordance with a conventional process. The propylene polymer (B) can be prepared by homopolymerizing propylene or copolymerizing propylene and a small amount of an $\alpha$-olefin of 4 to 20 carbon atoms in the presence of the above-described metallocene catalyst, in accordance with a conventional process.

If the propylene polymer (A) and the propylene polymer (B) are polymers prepared by the use of the metallocene compound, the content of the low-molecular weight component in the polymers is low. Therefore, the propylene polymer composition is almost free from burning in the heat molding process, and the resulting heat molded product hardly develops odor. Moreover, because the crystalline thickness becomes uniform, the heat molded product is excellent in impact resistance such as film impact and in creep resistance.

The propylene polymer composition comprises the propylene polymer (A) in an amount of 10 to 90% by weight, preferably 20 to 80% by weight, and the propylene polymer (B) in an amount of 90 to 10% by weight, preferably 80 to 20% by weight, and in this propylene polymer composition, m(1) the melt flow rate ($MFR_A$ (g/10 min)) of the propylene polymer (A) and the melt flow rate ($MFR_B$ (g/10 min)) of the propylene polymer (B) satisfy the following relation $$0.1 \leq \log (MFR_B/MFR_A) \leq 6.1,$$

Preferably $$0.2 \leq \log(MFR_B/MFR_A) \leq 5.7;$$

and (2) the density ($d_A$ (kg/m$^3$)) of the propylene polymer (A) and the density ($d_B$ (kg/m$^3$)) of the propylene polymer (B) satisfy the following relation $$2 \leq d_B - d_A \leq 31,$$

preferably $$4 \leq d_B - d_A \leq 28.$$

To the propylene polymer composition, additives, such as weathering stabilizers, heat stabilizers, antistatic agents, anti-slip agents, anti-blocking agents, anti-fogging agents, lubricants, pigments, dyes, nucleating agents, plasticizers, anti-aging agents, hydrochloric acid absorbents and antioxidants, may be optionally added so long as they are not detrimental to the objects of the invention.

The propylene polymer composition can be prepared by a conventionally known process. For example, the propylene polymer composition can be prepared by producing the propylene polymer (A) and the propylene polymer (B) in two or more stages under different reaction conditions using one polymerization reactor. Specifically, the propylene polymer composition can be prepared by a two-stage polymerization process wherein the propylene polymer (A) is produced in the first stage and the propylene polymer (B) is produced in the second stage, or the propylene polymer (B) is produced in the first stage and the propylene polymer (A) is produced in the second stage.

The propylene polymer composition may also be prepared by the use of plural polymerization reactors. In this case, the propylene polymer (A) is produced in one polymerization reactor and the propylene polymer (B) is then produced in another polymerization reactor in the presence of the propylene polymer (A), or the propylene polymer (B) is produced in one polymerization reactor and the propylene polymer (A) is then produced in another polymerization reactor in the presence of the propylene polymer (B).

The following processes are also available.

(1) The propylene polymer (A), the propylene polymer (B) and other components optionally used are mechanically blended by the use of, for example, an extruder or a kneader.

(2) The propylene polymer (A), the propylene polymer (B) and other components optionally used are dissolved in an appropriate good solvent (e.g., hydrocarbon solvents such as hexane, heptane, decane, cyclohexane, benzene, toluene and xylene), and then the solvent is removed from the resulting solution.

(3) The propylene polymer (A), the propylene polymer (B) and other components optionally used are each dissolved separately in an appropriate good solvent to prepare solutions, then the solutions are mixed, and the solvents are removed from the mixture.

(4) The above processes (1) to (3) are appropriately combined.

The propylene polymer composition of the invention is subjected to various heat molding processes, such as blow molding, vacuum-pressure forming, calendering, inflation molding, cast molding, extrusion molding, foam molding, stretched film molding and injection molding, whereby heat molded products are obtained.

The propylene polymer composition of the invention has excellent moldability.

When a pipe is produced from the propylene polymer composition, the composition preferably has the following properties:

(1) the melt flow rate, as measured at 230° C. under a load of 2.16 kg, is in the range of 0.005 to 2.0 g/10 min, preferably 0.01 to 1.5 g/10 min, (2) the temperature at the maximum peak position of an endothermic curve of said composition measured by a differential scanning calorimeter is in the range of 128 to 157° C., preferably 130 to 155° C., (3) the density is in the range of 899 to 911 kg/m$^3$, preferably 900 to 910 kg/m$^3$, and (4) the flexural modulus of a pressed sheet specimen prepared from said composition at 200° C. is in the range of 800 to 1,900 MPa, preferably 900 to 1,800 MPa.

The propylene polymer composition having the above properties shows excellent moldability into pipe, and the obtained pipe has excellent rigidity and creep resistance.

The above-mentioned propylene polymer composition can be prepared by, for example, melt kneading 30 to 70 parts by weight of the propylene polymer (A) having MFR (measured at 230° C. under a load of 2.16 kg) of 0.05 to 0.1 g/10 min, Tm (measured by DSC) of 105 to 115° C., a density of 885 to 895 kg/m$^2$ and a $C_{4-20}$ α-olefin constituent unit content of 2 to 8% by mol and 70 to 30 parts by weight of the propylene polymer (B) having MFR (measured at 230° C. under a load of 2.16 kg) of 0.1 to 0.8 g/10 min, Tm (measured by DSC) of 150 to 160° C., a density of 905 to 915 kg/m$^2$ and a $C_{4-20}$ α-olefin constituent unit content of 0 to 1.0% by mol, by means of an extruder.

The propylene polymer composition can also be prepared by a two-stage polymerization process, wherein the first stage is carried out to produce the propylene polymer (A) having MFR (measured at 230° C. under a load of 2.16 kg) of 0.002 to 0.02 g/10 min, Tm (measured by DSC) of 105 to 140° C., a density of 885 to 904 kg/m$^2$ and a $C_{4-20}$ α-olefin constituent unit content of 2 to 8% by mol and the second stage is carried out to produce the propylene polymer (B) having MFR (measured at 230° C. under a load of 2.16 kg) of 10 to 120 g/10 min, Tm (measured by DSC) of 145 to 165° C., a density of 906 to 920 kg/m$^2$ and a $C_{4-20}$ α-olefin constituent unit content of 0 to 1.5% by mol in such a manner that the propylene polymer (A) amounts to 30 to 70% by weight and the propylene polymer (B) amounts to 70 to 30% by weight, respectively, in the resulting composition.

When a film is formed from the propylene polymer composition, the composition preferably has the following properties:

(1) the melt flow rate, as measured at 230° C. under a load of 2.16 kg, is in the range of 4 to 25 g/10 min, preferably 5 to 20 g/10 min, (2) the temperature at the maximum peak position of an endothermic curve of said composition measured by a differential scanning calorimeter is in the range of 128 to 157° C., preferably 130 to 155° C., (3) the density is in the range of 899 to 911 kg/m$^3$, preferably 900 to 910 kg/m$^3$, and (4) the flexural modulus of a pressed sheet specimen prepared from said composition at 200° C. is in the range of 800 to 1,900 MPa, preferably 900 to 1,800 MPa.

The propylene polymer composition having the above properties shows excellent moldability into film, and the obtained film has excellent transparency and impact resistance.

The above-mentioned propylene polymer composition can be prepared by, for example, melt kneading 30 to 70 parts by weight of the propylene polymer (A) having MFR (measured at 230° C. under a load of 2.16 kg) of 4 to 7 g/10 min, Tm (measured by DSC) of 105 to 115° C., a density of 888 to 895 kg/m$^2$ and a $C_{4-20}$ α-olefin constituent unit content of 2 to 8% by mol and 30 to 70 parts by weight of the propylene polymer (B) having MFR (measured at 230° C. under a load of 2.16 kg) of 10 to 20 g/10 min, Tm (measured by DSC) of 150 to 160° C., a density of 905 to 915 kg/m$^2$ and a $C_{4-20}$ α-olefin constituent unit content of 0 to 1.0% by mol, by means of an extruder.

The propylene polymer composition can also be prepared by a two-stage polymerization process, wherein the first stage is carried out to produce the propylene polymer (A) having MFR (measured at 230° C. under a load of 2.16 kg) of 0.01 to 2.0 g/10 min, Tm (measured by DSC) of 105 to 140° C., a density of 885 to 904 kg/m$^2$ and a $C_{4-20}$ α-olefin constituent unit content of 2 to 8% by mol and the second stage is carried out to produce the propylene polymer (B) having MFR (measured at 230° C. under a load of 2.16 kg) of 100 to 550 g/10 min, Tm (measured by DSC) of 145 to 170° C., a density of 906 to 920 kg/m$^2$ and a $C_{4-20}$ α-olefin constituent unit content of 0 to 1.0% by mol in such a manner that the propylene polymer (A) amounts to 30 to 70% by weight and the propylene polymer (B) amounts to 70 to 30% by weight, respectively, in the resulting composition.

In order to produce a pipe from the propylene polymer composition, an ordinary extrusion molding process can be adopted. The pipe produced by the process has excellent creep resistance.

In order to produce a film from the propylene polymer composition, a conventionally known molding process, such as casting or melt extrusion, can be adopted. The film produced by the process has excellent transparency and impact resistance.

EFFECT OF THE INVENTION

From the propylene polymer composition of the invention, heat molded products having excellent mechanical strength can be produced. Further, the propylene polymer composition has excellent moldability into pipe, and the obtained pipe has excellent rigidity and creep resistance. The film produced from the propylene polymer composition of the invention has excellent transparency and impact resistance.

EXAMPLE

The present invention is further described with reference to the following examples, but it should be construed that the invention is in no way limited to those examples.

Properties of the compositions and the molded products in the examples were measured in the following manner.

Melt Flow Rate (MFR)

The melt flow rate was measured at 230° C. under a load of 2.16 kg in accordance with ASTM D1238-65T.

Melting Point (Tm)

Using a differential scanning calorimeter (DSC), a sample of 5 mg was completely melted at 200° C., cooled at a rate of 10° C./min and then heated at a rate of 10 ° C./min to detect an endothermic peak, and the temperature at the position of the endothermic peak was taken as a melting point.

Density

A strand containing no bubbles, which was obtained by the MFR measurement, was cut to give a specimen having a length of about 1 cm, and the specimen was introduced into a density gradient tube to measure the density.

α-Olefin Content

In a sample tube having a diameter of 10 mm, about 200 mg of a sample was homogeneously dissolved in 1 ml of hexachlorobutadiene, and a $^{13}$C-NMR spectrum of the solution was measured under the conditions of a measuring temperature of 120° C., a measuring frequency of 25.05 MHz, a spectral width of 1,500 MHz, a pulse repetition time of 4.2 sec and a pulse width of 6 μsec to determine the α-olefin content.

Flexural Modulus (FM)

A FM test specimen was punched out from a pressed sheet having a thickness of 2 mm produced at 230° C. and was subjected to a FM test under the conditions of a temperature of 23° C., a span of 32 mm and a flexural rate of 5 mm/min in accordance with ASTM D790 to determine the flexural modulus.

Creep Resistance

In accordance with JIS K6762, a pipe having a length of 50 cm after 48 hours or more since molding was provided with closures at the both ends and was immersed in a water bath at 80° C. Then, nitrogen was blown into the pipe to make a hoop stress be 6 MPa and to maintain the internal pressure constant. The period of time at the end of which the pipe was broken was measured to evaluate the creep resistance.

Transparency (haze)

The transparency was measured in accordance with ASTM D1003.

Film Impact

The film impact was measured by a pendulum film impact tester manufactured by Toyo Seiki Seisakusho.

Example 1

Two-stage polymerization was carried out in accordance with a conventional process using a metallocene catalyst. That is, a propylene/octene copolymer (A-1) having properties shown in Table 1 was prepared in the first stage and a propylene homopolymer (B-1) having properties shown in Table 2 was prepared in the second stage, to obtain a propylene polymer composition (C-1) having a (A-1)/(B-1) weight ratio of 47/53 and having properties shown in Table 3. To 100 parts by weight of the propylene polymer composition (C-1), 0.4 part by weight of 1,3,5-trimethyl-2,4,6-tris(3,5-di-t-butyl-4-hydroxyphenyl)benzylbenzene, 0.2 part by weight of tetrakis[methylene-3-(3,5-di-t-butyl-4-hydroxyphenyl)propionate]methane, 0.2 part by weight of n-octadecyl-3-(4'-hydroxy-3', 5'-di-t-butylphenyl) propionate, 0.15 part by weight of 2,4-di-t-butylphenyl-3,5-di-t-butyl-4-hydroxybenzoate and 0.1 part by weight of calcium stearate were added. The resulting mixture was melt kneaded at 230° C. by a single-screw extruder to obtain pellets. The pellets were subjected to extrusion molding at 260° C. to produce a pipe having an outer diameter of 60 mm and an inner diameter of 5.5 mm. The propylene polymer composition (C-1) had excellent moldability into pipe. The creep resistance of the obtained pipe is set forth in Table 3.

Example 2

Two-stage polymerization was carried out in accordance with a conventional process using a metallocene catalyst. That is, a propylene/octene copolymer (A-2) having properties shown in Table 1 was prepared in the first stage and a propylene homopolymer (B-2) having properties shown in Table 2 was prepared in the second stage, to obtain a propylene polymer composition (C-2) having a (A-2)/(B-2) weight ratio of 47/53 and having properties shown in Table 3. Using the propylene polymer composition (C-2), a pipe was produced in the same manner as in Example 1. The propylene polymer composition (C-2) had excellent moldability into pipe. The creep resistance of the obtained pipe is set forth in Table 3.

Example 3

To 100 parts by weight of a propylene polymer composition (C-3) which had properties shown in Table 3 and which consisted of 69% by weight of a propylene/octene copolymer (A-3) prepared by a conventional process using a metallocene catalyst and having properties shown in Table 1 and 31% by weight of a propylene homopolymer (B-3) prepared by a conventional process using a metallocene catalyst and having properties shown in Table 2, 0.4 part by weight of 1,3,5-trimethyl-2,4,6-tris(3,5-di-t-butyl-4-hydroxyphenyl)benzylbenzene, 0.2 part by weight of tetrakis[methylene-3-(3,5-di-t-butyl-4-hydroxyphenyl) propionate]methane, 0.2 part by weight of n-octadecyl-3-(4'-hydroxy-3', 5'-di-t-butylphenyl)propionate, 0.15 part by weight of 2,4-di-t-butylphenyl-3,5-di-t-butyl-4-hydroxybenzoate and 0.1 part by weight of calcium stearate were added. The resulting mixture was melt kneaded at 230° C. by a single-screw extruder to obtain pellets. The pellets were subjected to extrusion molding at 260° C. to produce a pipe. The propylene polymer composition (C-3) had excellent moldability into pipe. The creep resistance of the obtained pipe is set forth in Table 3.

Example 4

Two-stage polymerization was carried out in accordance with a conventional process using a metallocene catalyst. That is, a propylene/octene copolymer (A-4) having properties shown in Table 1 was prepared in the first stage and a propylene homopolymer (B-4) having properties shown in Table 2 was prepared in the second stage, to obtain a propylene polymer composition (C-4) having a (A-4)/(B-4) weight ratio of 60/40 and having properties shown in Table 3. To 100 parts by weight of the propylene polymer composition (C-4), 0.06 part by weight of tetrakis[methylene-3-(3,5-di-t-butyl-4-hydroxyphenyl)propionate]methane, 0.06 part by weight of tris-mono/dinonylphenyl phosphite, 0.05 part by weight of calcium stearate, 0.1 part by weight of erucylamide and 0.15 part by weight of silica were added. The resulting mixture was melt kneaded at 230° C. by a single-screw extruder to obtain pellets. The pellets were subjected to cast film molding at 260° C. to produce a film having a thickness of 50 μm. The propylene polymer composition (C-4) had excellent moldability into film. The transparency and film impact strength of the obtained film and the flexural modulus of the pressed sheet are set forth in Table 3.

Example 5

To 100 parts by weight of a propylene polymer composition (C-5) which had properties shown in Table 3 and which consisted of 49% by weight of a propylene/octene copolymer (A-5) prepared by a conventional process using a metallocene catalyst and having properties shown in Table 1 and 51% by weight of a propylene homopolymer (B-5) prepared by a conventional process using a metallocene catalyst and having properties shown in Table 2, 0.06 part by weight of tetrakis[methylene-3-(3,5-di-t-butyl-4-hydroxyphenyl)propionate]methane, 0.06 part by weight of tris-mono/dinonylphenyl phosphite, 0.05 part by weight of calcium stearate, 0.1 part by weight of erucylamide and 0.15 part by weight of silica were added. The resulting mixture was melt kneaded at 230° C. by a twin-screw extruder to obtain pellets. The pellets were subjected to cast film molding at 260° C. to produce a film having a thickness of 50 μm. The propylene polymer composition (C-5) had excellent moldability into film. The transparency and film impact strength of the obtained film and the flexural modulus of the pressed sheet are set forth in Table 3.

Examples 6–9

Pellets of propylene polymer compositions were prepared in the same manner as in Example 5, except for using propylene polymer compositions each of which consisted of a propylene/octene copolymer prepared by a conventional process using a metallocene catalyst and having properties shown in Table 1 and a propylene homopolymer prepared by a conventional process using a metallocene catalyst and having properties shown in Table 2 and each of which had a component ratio and properties shown in Table 3. The pellets were subjected to cast film molding at 260° C. to produce films having a thickness of 50 μm. All of the propylene polymer compositions had excellent moldability into film. The transparency and film impact strength of the obtained films and the flexural modulus of the pressed sheets are set forth in Table 3.

TABLE 1

| | Propylene Polymer (A) | | | | |
|---|---|---|---|---|---|
| | A-1 | A-2 | A-3 | A-4 | A-5 |
| MFR (g/10 Min) | 0.01 | 0.02 | 0.01 | 1.0 | 0.8 |
| TM (°C.) | 130 | 130 | 132 | 128 | 131 |
| Density (kg/m$^3$) | 900 | 900 | 900 | 898 | 900 |
| α-olefin content (mol %) | Octene 4.2 | Octene 2.6 | Octene 4.3 | Octene 4.5 | Octene 4.2 |
| | A-6 | A-7 | A-8 | A-9 | |
| MFR (g/10 Min) | 0.5 | 0.2 | 0.09 | 2.0 | |
| TM (°C.) | 127 | 128 | 130 | 127 | |
| Density (kg/m$^3$) | 898 | 898 | 900 | 899 | |
| α-olefin content (mol %) | Octene 5.0 | Octene 5.3 | Octene 4.3 | Octene 5.1 | |

TABLE 2

| | Propylene Polymer (B) | | | | |
|---|---|---|---|---|---|
| | B-1 | B-2 | B-3 | B-4 | B-5 |
| MFR (g/10 Min) | 10 | 20 | 50 | 100 | 150 |
| TM (°C.) | 160 | 148 | 165 | 160 | 165 |
| Density (kg/m$^3$) | 912 | 906 | 914 | 912 | 914 |
| | B-6 | B-7 | B-8 | B-9 | |
| MFR (g/10 Min) | 100 | 180 | 400 | 100 | |
| TM (°C.) | 160 | 165 | 160 | 160 | |
| Density (kg/m$^3$) | 912 | 915 | 913 | 912 | |

TABLE 3

| | Examples | | | | |
|---|---|---|---|---|---|
| | 1 | 2 | 3 | 4 | 5 |
| Propylene polymer composition | C-1 | C-2 | C-3 | C-4 | C-5 |
| A/B weight ratio | 47/53 | 47/53 | 69/31 | 60/40 | 49/51 |
| MFR (g/10 min) | 0.1 | 0.2 | 0.1 | 8.0 | 8.1 |
| Tm (°C.) | 145 | 137 | 140 | 146 | 148 |
| Density (kg/m$^3$) | 906 | 903 | 904 | 906 | 907 |
| log(MFR$_B$/MFR$_A$) | 3 | 3 | 3.7 | 2 | 2.3 |
| d$_A$–d$_B$ | 12 | 6 | 14 | 14 | 14 |
| Pressed sheet FM (MPa) | 1450 | 1150 | 1260 | 1450 | 1540 |
| Pipe Creep Resistance | ◎ | ◎ | ◎ | — | — |
| Film Haze (%) | — | — | — | 3.5 | 4.0 |
| Film imapct (kJ/m) | — | — | — | 25 | 27 |

| | 6 | 7 | 8 | 9 |
|---|---|---|---|---|
| Propylene polymer composition | C-6 | C-7 | C-8 | C-9 |
| A/B weight ratio | 64/36 | 67/33 | 65/35 | 52/48 |
| MFR (g/10 min) | 6.8 | 7.2 | 5.5 | 8.5 |
| Tm (°C.) | 140 | 141 | 142 | 147 |
| Density (kg/m$^3$) | 903 | 904 | 905 | 906 |
| log (MFR$_B$/MFR$_A$) | 2.3 | 3.0 | 3.6 | 1.7 |
| d$_A$–d$_B$ | 14 | 17 | 13 | 13 |
| Pressed sheet FM (MPa) | 1200 | 1240 | 1380 | 1470 |
| Pipe Creep Resistance | — | — | — | — |
| Film Haze (%) | 3.2 | 4.5 | 5.2 | 4.3 |
| Film imapct (kJ/m) | 28 | 28 | 30 | 23 |

—: not measured

What is claimed is:

1. A propylene polymer composition comprising:

(A) a propylene polymer in an amount of 10 to 90% by weight, said polymer having the following properties:
  (1) the melt flow rate, as measured at 230° C. under a load of 2.16 kg, is in the range of 0.001 to 8 g/10 min,
  (2) the temperature at the maximum peak position of an endothermic curve of said polymer measured by a differential scanning calorimeter is in the range of 95 to 145° C.,
  (3) the density is in the range of 885 to 905 kg/m$^3$, and
  (4) the content of constituent units derived from an α-olefin of 4 to 20 carbon atoms is in the range of 1.5 to 11% by mol; and (B) a propylene polymer in an amount of 90 to 10% by weight, said polymer having the following properties:
  (1) the melt flow rate, as measured at 230° C. under a load of 2.16 kg, is in the range of 0.1 to 600 g/10 min,
  (2) the temperature at the maximum peak position of an endothermic curve of said polymer measured by a differential scanning calorimeter is in the range of 145 to 170° C.,
  (3) the density is in the range of 905 to 916 kg/m$^3$, and
  (4) the content of constituent units derived from an α-olefin of 4 to 20 carbon atoms is in the range of 0 to 2% by mol;

wherein (1) the melt flow rate (MFR$_A$ (g/10 min)) of the propylene polymer (A) and the melt flow rate (MFR$_B$ (g/10 min)) of the propylene polymer (B) satisfy the following relation $$0.1 \leq \log(\mathrm{MFR}_B/\mathrm{MFR}_A) \leq 6.1,$$

and (2) the density (d$_A$ (kg/m$^3$)) of the propylene polymer (A) and the density (d$_B$ (kg/m$^3$)) of the propylene polymer (B) satisfy the following relation $$2 \leq d_B - d_A \leq 31.$$

2. The propylene polymer composition as claimed in claim 1, which has the following properties:
  (1) the melt flow rate, as measured at 230° C. under a load of 2.16 kg, is in the range of 0.005 to 2.0 g/10 min,
  (2) the temperature at the maximum peak position of an endothermic curve of said composition measured by a differential scanning calorimeter is in the range of 128 to 157° C.,
  (3) the density is in the range of 899 to 911 kg/m$^3$, and
  (4) the flexural modulus of a pressed sheet specimen prepared from said composition at 200° C. is in the range of 800 to 1,900 MPa.

3. The propylene polymer composition as claimed in claim 1, which has the following properties:
  (1) the melt flow rate, as measured at 230° C. under a load of 2.16 kg, is in the range of 4 to 25 g/10 min,
  (2) the temperature at the maximum peak position of an endothermic curve of said composition measured by a differential scanning calorimeter is in the range of 128 to 157° C.,
  (3) the density is in the range of 899 to 911 kg/m$^3$, and
  (4) the flexural modulus of a pressed sheet specimen prepared from said composition at 200° C. is in the range of 800 to 1,900 MPa.

4. The propylene polymer composition as claimed in any one of claims 1 to 3, wherein the propylene polymer (A) and the propylene polymer (B) are prepared by the use of a metallocene catalyst.

5. A heat molded product obtained by heat molding the propylene polymer composition as claimed in claim 1.

6. A pipe obtained by heat molding the propylene polymer composition as claimed in claim 2.

7. A film obtained by heat molding the propylene polymer composition as claimed in claim 3.

* * * * *